Oct. 14, 1952   A. M. MIERS   2,613,766
BRAKE RIGGING
Filed Nov. 24, 1948   3 Sheets-Sheet 1
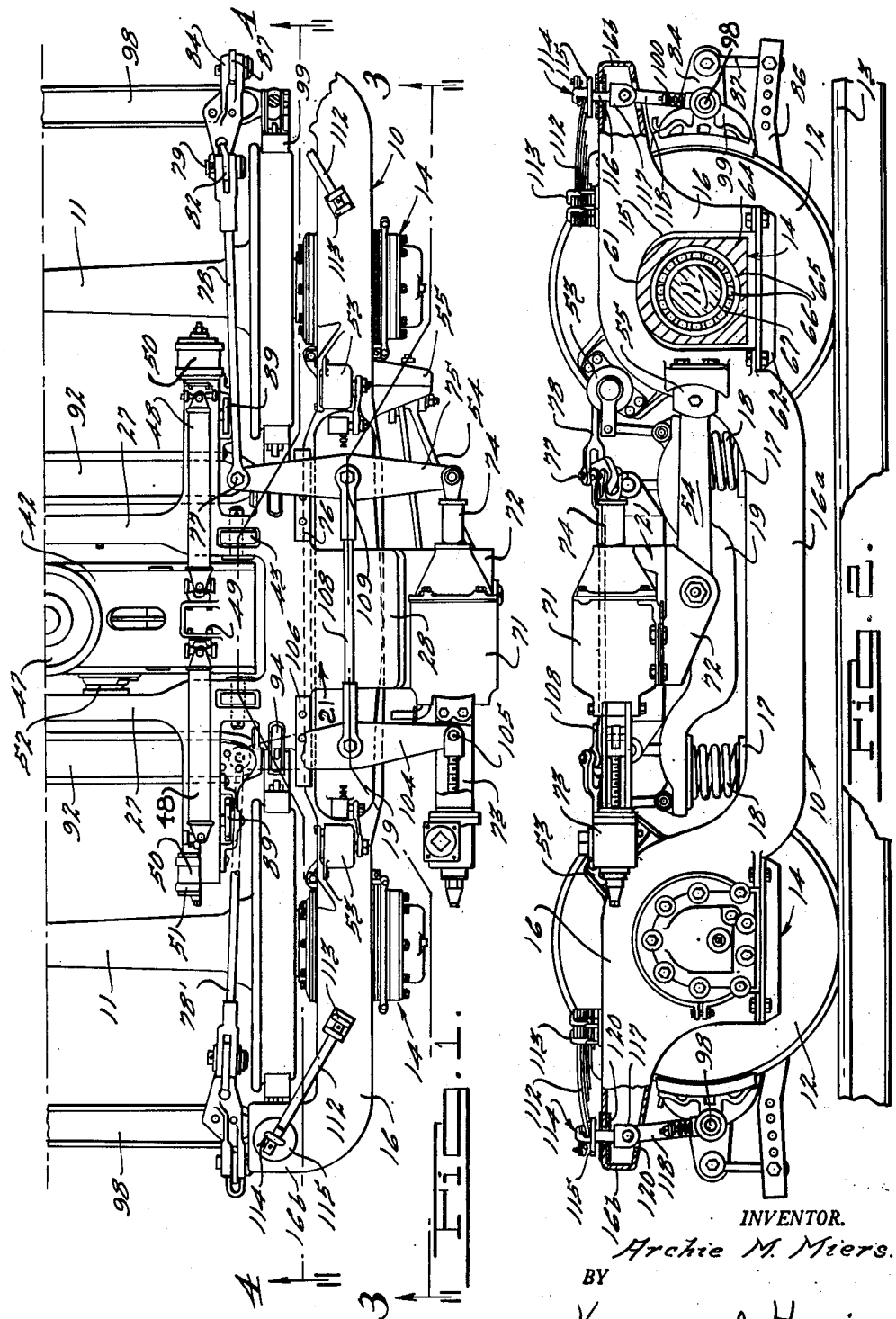
INVENTOR.
Archie M. Miers.
BY
Harness and Harris
ATTORNEYS.

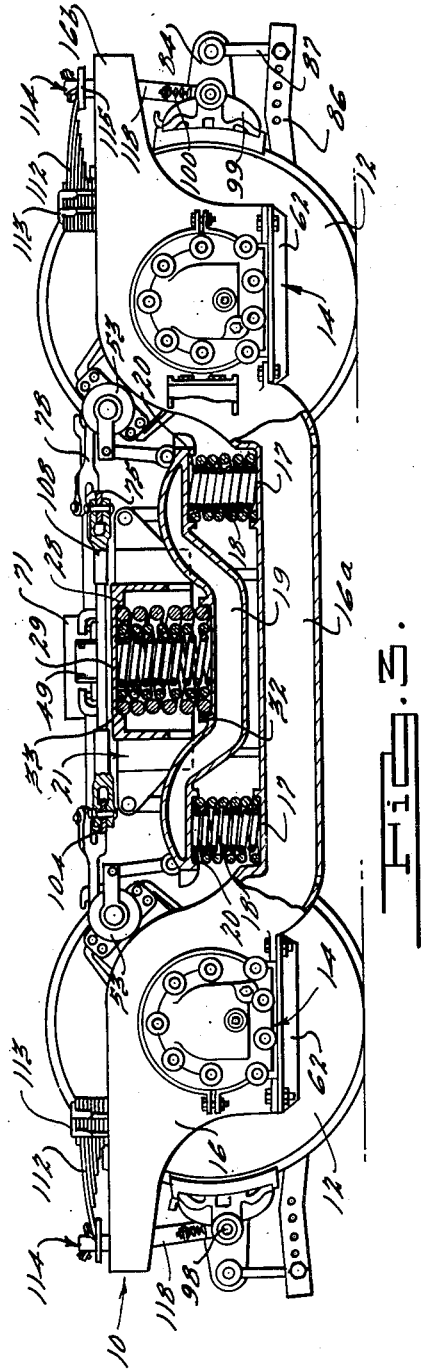
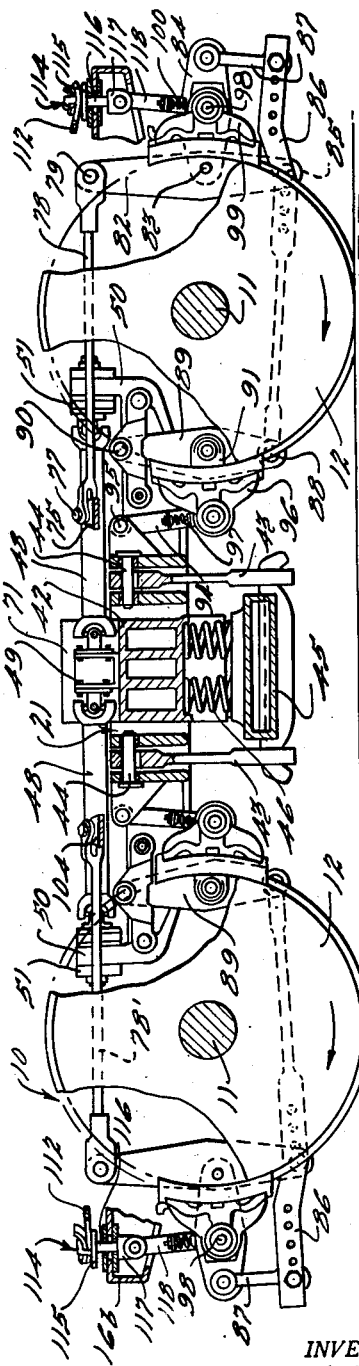

Oct. 14, 1952 — A. M. MIERS — 2,613,766
BRAKE RIGGING
Filed Nov. 24, 1948 — 3 Sheets-Sheet 3

INVENTOR.
Archie M. Miers.
BY
Harness and Harris
ATTORNEYS

Patented Oct. 14, 1952

2,613,766

UNITED STATES PATENT OFFICE 2,613,766
BRAKE RIGGING

Archie M. Miers, Croton-on-Hudson, N. Y., assignor to Chrysler Corporation, Highland Park, Mich., a corporation of Delaware Application November 24, 1948, Serial No. 61,805

11 Claims. (Cl. 188—205)

This invention relates to railway car trucks and has particular reference to a simplified and improved means for mounting the brake rigging on the truck unit in such a manner that wear of the rigging components is materially reduced. This reduction in wear of the rigging components is accomplished by resiliently suspending the rigging from the truck frame members such that the road shock applied to the frame members is effectively absorbed by the suspension without being transmitted to the rigging. While the resilient brake rigging suspension absorbs the road shock, during normal running with the brakes released, still, the arrangement is such that positive, unyielding supports are provided for the brake beams during application of the brakes and therefore the resilient suspension means is not required to take the brake reaction, and thus improved braking results.

Railroad maintenance records show conclusively that one of the most frequent causes of lay-up of railway cars for repairs is wear and damage in the brake rigging. The fact that the brake beam hanger links are often fixedly supported on unsprung frame members has been found to be one of the primary causes for the maintenance difficulties associated with the brake rigging.

It is a primary object of this invention to mount the brake rigging on the truck frame members in such a manner that under normal running condition with the brakes released the brake beam hangers are suspended from resilient means which effectively absorb the road shock transmitted through the frame members to the rigging, the suspension arrangement being such that on application of the brakes the brake beam hangers are automatically anchored to unsprung frame members which provide unyielding, positive, supports to take the brake reaction.

It is an additional object of this invention to provide a brake beam suspension that is simple, durable, efficient, and economical to manufacture, install and maintain.

The nature of this invention as well as additional objects and advantages thereof will become fully apparent from a reading of the following description and a consideration of the related drawings wherein:

Fig. 1 is a half plan view of a railway truck embodying this invention;

Fig. 2 is a side elevation of the railway truck shown in Fig. 1 with portions of the truck frame broken away to clearly disclose the invention;

Fig. 3 is a vertical sectional view taken along the lines 3—3 of Fig. 1;

Fig. 4 is a sectional elevation taken along the lines 4—4 of Fig. 1;

Figure 5:
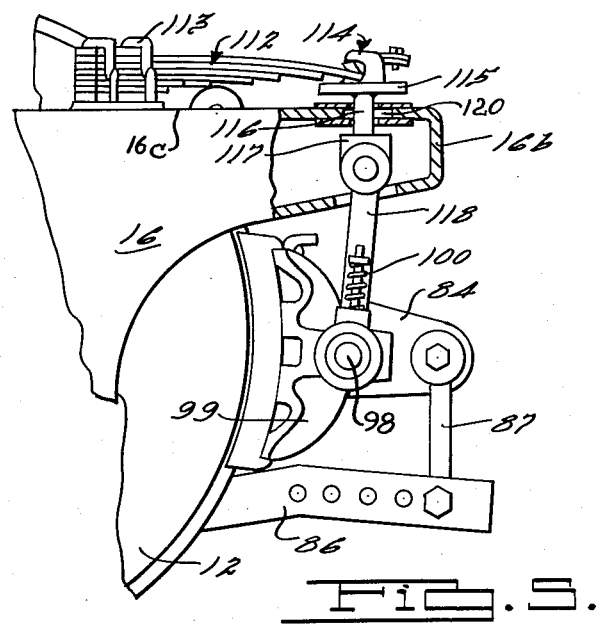
Fig. 5 is an enlarged sectional elevation of an end portion of a truck frame mounting the brake beam hanger suspension shown in Figs. 1 to 4.

The railway car truck 10 comprises longitudinally extending, transversely spaced, side frame members 16 mounted on a pair of longitudinally spaced, transversely extending, axles 11. Each axle 11 carries a pair of wheels 12 which engage the conventional track rails 13. The protruding ends of each axle 11 are journaled in wheel axle bearing assemblies 14 one of which is clearly shown in Fig. 2 and is subsequently described in detail. The bearing assemblies 14 are mounted in the inverted U-shaped journal openings 15 (see Fig. 2) in the ends of the side frame members 16. The mounting of the bearing assemblies 14 in the side frame journal openings 15 is such as to provide an unsprung, "pedestalless" type of connection wherein the axles and bearing assemblies are solidly connected to the side frame members and precluded from vertical movement with respect to the side frame members. Any type of solid bearing connection may be used between the wheel axles and the side frames without affecting the functioning of the brake beam suspension. The wheel axle bearing assembly herein disclosed is similar to that shown in the U. S. patent to Janeway and Miers, No. 2,335,120.

Each of the side frames 16 has a depressed middle section 16a provided with longitudinally spaced seats 17 on which are mounted nested coil springs 18 through which the truck load is resiliently applied to the side frame members. The springs 18 in turn support the end portions of the longitudinally extending beam members 19 which also form a part of the load supporting system. Beams 19 include the spring seats 20 to receive the upper ends of the coil springs 18. Beams 19 are arranged so as to support another load carrying structure, namely, the transom frame 21. This transom frame 21 comprises longitudinally spaced members 27 extending transversely of the truck, which members are joined at their ends by connecting sections 28 which overlie the central portions of the beams 19. The connecting sections 28 are formed with spring receiving seats 29 which are vertically aligned with the complementary seats 32 on the beams 19. These aligned spring seats have mounted therebetween the nested coil springs 33. The springs 33 transmit the load of the transom frame 21 to the beams 19 and at the same time cushion the supported truck load against impacts or shocks transmitted from the wheels to the beams 19.

Transom frame 21 pivotally supports the truck bolster member 42 by means of swing hanger assemblies 43 which assemblies permit limited transverse swinging movement of the truck bolster relative to the transom frame. Swing hanger assemblies 43 are pivotally connected to the transom frame 21 by the swing hanger pins 44. Hanger assemblies 43 support the plank member 45 which rockably supports the bolster 42 at its center portion. Adjacent each outer end of plank 45 there are mounted spring units 46 that resiliently limit the transverse rocking of the bolster 42 relative to the plank member 45.

Thrust links 48, having their inner ends secured to a bracket 49 carried by the bolster 42 and their outer ends anchored to brackets 50 carried by the transom frame 21, restrict longitudinal movement of the bolster relative to the transom frame. Universal joints connect the thrust links 48 to their supporting brackets 49 and 50. Each link 48 includes a resilient draft member 51 which permits the links 48 to take up the longitudinal thrust between the bolster 42 and the transom frame 21. Shock absorber units 52 restrain relative transverse or lateral movement between the bolster and transom frame.

Relative movement between the side frame members 16 and the beam members 19 is controlled by the shock absorber units 53 mounted therebetween. Along the outboard side of each side frame 16 there is positioned a longitudinally extending stabilizing member 54, having one of its ends pivotally connected to the bracket 72 carried by the transom frame 21 and its other end pivotally connected to a bracket 55 carried by the side frame 16 to restrain relative longitudinal and transverse movement between the side frame members and the transom frame.

The central portion of the truck bolster 42 is formed with a conventional bearing member 47 which receives a complementary bearing portion carried by the body unit to be mounted on the truck unit. The bearing connections between the body unit and the truck bolsters permit relative turning movement between the car body unit and the supporting truck units.

It is now thought to be obvious how the load of the car body unit and its contents is transferred to the truck bolster 42 and then through the swing hanger assemblies 43 to the transom frame 21. The transom frame 21 rests upon the springs 33 which are in turn supported on the beams 19. Beams 19 transmit the car load to the side frame members 16 through the springs 18. The side frame members 16 are rigidly supported at each end on the wheel axle bearing assemblies 14 which are mounted on the ends of the axles 11.

The manner of solidly mounting the side frames 16 on the axle supported wheel bearing assemblies 14, is shown in Fig. 2. Each side frame end portion is provided with a U-shaped journal opening 15 to receive a wheel axle bearing assembly 14. Each journal opening 15 is formed with a bearing seat 61 in the curved bight portion of its U-shaped wall. The seat portion 61 receives the rigid bearing assembly 14 carried by the wheel axle 11. Tie members 62 extend across the open mouth of the U-shaped opening 15 to retain the bearing assembly 14 within the opening 15. Each journal bearing assembly 14 comprises an outer housing 64 within which are concentrically mounted an outer roller bearing race 65, a set of tapered roller bearings 66, and an inner roller bearing race 67, the latter being secured to and rotatable with the wheel axle 11. Housing 64 is adapted to contain oil or some other liquid lubricant so that the rollers 66 of the bearing assembly are constantly supplied with lubricant.

The wheel brake mechanism is best illustrated in Figs. 1 and 4 and comprises an air cylinder 71 disposed on each side of the truck unit. Cylinders 71 are mounted on laterally extending brackets 72 protruding from the transom frame connecting sections 28. Connected to one end of each air cylinder 71 is a longitudinally extending brake shoe slack adjusting mechanism 73. Extending from the opposite end of each air cylinder 71 is a piston actuated connecting rod 74 adapted to operate the brake linkage associated therewith. Pivotally connected to the exposed end of rod 74 is a horizontally disposed, transversely extending lever 75. Lever 75 is slidably supported adjacent its inner end by the bearing block 76 carried by the transom frame member 21. The inwardly disposed end of lever 75 is pivotally connected at 77 to the longitudinally extending, connecting rod 78. Rod 78 is pivotally connected at 79 to the vertically disposed lever 82. Lever 82 is pivotally connected intermediate its ends, as at 83, to the inwardly disposed end of the longitudinally extending, lever member 84. Lever 84 is rigidly mounted on the resiliently supported, transversely extending, brake beam 98. The resilient suspension for brake beam 98 will be subsequently described in detail. Brake beam 98 carries on its outer end portions the brake shoes 99 which are adapted to be rocked into braking engagement with the rolling surfaces of the adjacent truck wheels. Shoes 99 are pivotally mounted on the ends of the brake beam 98 so as to permit relative rotatable movement of the shoes in a vertical plane. However, the freedom of rotation of the shoes 99 relative to the beam 98 is restrained by the spring-loaded bearing members 100 which tend to retain the shoes in fixed positions relative to the beam 98. Bearing members 100 prevent the shoes from dragging on the wheels when the brakes are released which eliminates wear and chatter. The lever 82 is pivotally connected at 85 to an intermediate portion of the compensating and actuating link 86. The outer end of link 86 is connected by the pivoted link 87 to the outer end of the brake beam supported lever 84. The connections between the several levers 82 and 84 and links 86 and 87 permit relative pivotal movement between these members and constitute a parallelogram linkage to prevent rotation of brake beam 98 in their hanger supports. A plurality of pin holes are located along the length of link 86 to permit adjustment of the brake linkage to compensate for wear of the rigging components. The inner end of actuating link 86 is pivotally connected at 88 to a vertically disposed lever 89 that is pivotally connected at 90 to the spring supported transom frame 21. A horizontally disposed, longitudinally extending, lever-like projection 91, rigidly mounted on the transversely extending inner brake beam 92, is pivotally connected to the intermediate portion of the depending brake linkage lever 89. Lever 94 which is pivotally mounted at 95 on the spring supported transom frame 21, has its lower end pivotally connected to the outer end portion of the inner brake beam 92. Brake beam 92 has rotatably mounted on its ends the inner brake shoes 96 which are restrained against free pivotal movement by the spring-loaded bearing members 97 similar to the bearing members 100 associated with the outer brake shoes 99. The transom frame 21 with the depending levers 89 and 94 and the brake beam lever 91 constitute a parallelogram linkage to control movement of the inner brake shoe 96. The actuating link 86 ties together the parallelogram linkages for the inner and outer brake shoes so as to bring about substantially simultaneous application of both the inner and outer brake shoes when the brakes are to be applied.

The brake rigging on all wheels of the truck is identical and for that reason the rigging on only one wheel has been described. The brake suspension that has been described will be considered a front wheel suspension for purposes of discussion. To coordinate the rigging on the front and rear wheels along each side of the truck a horizontally disposed, transversely extending rear wheel brake lever 104, similar in design to lever 75 associated with the front wheel brakes, is pivotally connected to an adjustably mounted pivot pin 105 carried by the brake shoe slack adjusting mechanism 75. The inwardly disposed end portion of lever 104 is pivotally connected to the connecting rod 78' for the brake linkage associated with the rear wheel brakes. Lever 104 is slidably supported on a bearing block 106 carried by the transom frame member, the block 106 being similar to the bearing block 76 for the lever 75 associated with the front wheel brakes. The intermediate portions of levers 75 and 104 are connected together by a longitudinally extending equalizing link 108 that coordinates the action of the front and rear wheel braking mechanisms.

It is thought to be obvious how admission of air under pressure to cylinder 71, so as to cause connecting rod 74 to move to the right towards the front wheels of the truck, will apply the wheel brakes to both the front and rear wheels of the truck. Movement of rod 74 forwardly rocks lever 75 about pivot pin connection 109 and this pulls rod 78 rearwardly. Moving rod 78 rearwardly rocks lever 82 rearwardly about pivot pin 85 and this pulls brake shoe 99 into engagement with the outer side of the front wheel. Any further rearward movement of rod 78 then rocks lever 82 about the anchored pivot pin 83 and this causes pivot pin 85 and actuating link 86 to move forwardly to swing brake shoe 96 into engagement with the inner side of the front wheel. This series of movements takes place practically instantaneously therefore both the inner and outer brake shoes, 96 and 99 respectively, are actuated at practically the same time. Due to the equalizing link 108, which connects the front and rear wheel brake linkages, the forward movement of lever 75 during application of the brakes moves the lever 104 of the rear wheel brake rigging forwardly and this actuates the rear wheel brake linkage in the same manner as described for the front wheel brakes consequently both the front and rear wheel brakes are actuated at the same time. The air supply for the air cylinders on each side of the truck is such that the brakes on each side of the truck are operated simultaneously.

As a result of the rigid mounting of the side frame members 16 on the wheel axles 11 it is obvious that road shock will be transmitted from the wheels 12 to the side frame 16 and thence to the supports for the brake rigging suspended from the unsprung side frames 16. Accordingly, if the brake rigging is not resiliently supported from the side frames 16 in such a manner as to insulate the rigging from the shocks applied to the side frames, when the brakes are released, then the road shock transmitted to the rigging supports will cause accelerated wear of the bearings and associated elements in the rigging which can result in a frequent shearing off of the brake beam hanger pins, that is the pins that pivotally support the beam hangers 118. The wear resulting from road shock in a rigidly supported brake rigging construction thereby materially reduces the life of the side frame supported brake rigging and is a constant source of possible trouble. Not only are the brakes rendered inoperative by such failures of the brake rigging components but in addition the brake beam rigging may drop down on the rails and derail the truck units and their supported cars with a consequent loss of life and property.

To eliminate this possible source of trouble in the brake rigging, the side frame supported brake beams 98 are provided with resilient suspensions that effectively absorb all shock impacts that might be transmitted to their rigging. The suspension arrangement is such that a rigid support is automatically provided for this brake rigging when the brakes are applied but at all other times this rigging is resiliently insulated from the supporting frame members. This resilient shock absorbing suspension comprises (see Fig. 5) a cantilever type leaf spring unit 112 rigidly mounted on the ends of the upper walls 16c of each of the side frames 16 by means of U-bolts 113. Spring units 112 are positioned such that the free ends of the cantilever spring arms overlie the transversely extending end portions 16b of the side frames which in turn overlie the end portions of the outer brake beams 98. Fixedly mounted on the free end of each of the spring units 112 is a depending brake beam hanger support 114 that extends downwardly through a vertically extending opening 120 in the end portion 16b of the associated side frame. Each brake beam hanger support 114 is formed with an upper, horizontally extending, washer-like, bearing portion 115, an intermediate, vertically extending, neck portion 116, and a lower, U-shaped, yoke portion 117. Pivotally mounted in each U-shaped yoke portion 117 by means of a hanger pin is a brake beam hanger 118 which has its lower end portion pivotally connected to an end portion of an outer brake beam 98.

The spring units 112 are of such a stiffness that they will deflect sufficiently to cushion the road shock transmitted to the frames 16 yet hold the brake beam hanger supports 114 in suspended positions such that the hanger support bearing portions 115 and the yoke portions 117 are out of contact with the adjacent portions 16c of the side frame members when the brakes are not being applied. The length of the neck portions 116 of the supports 114 is such that sufficient jounce space is provided between the portions 115 and 117 to absorb all shocks applied to the side frame members without the portions 115 and 117 contacting the upper or lower sides of the top walls 16c of the side frame members. By this arrangement, under normal running conditions with the brake released, the brake beam hanger links 114 are free of the side frame portions 16c and thus are not subjected to wear resulting from road shock. When the brakes are applied the brake reaction between the truck wheels and the brake shoes is transmitted to the brake beam hanger supports 114 and these supports are forced either upwardly or downwardly, depending on the direction of wheel rotation, until the yokes 117 or the washer-like bearing portions 115 bear against the upper walls 16c of the side frame members so as to provide a firm, rigid support for the brake rigging. Fig. 4 shows the relative position of the swing hanger bearing portions 115, the yoke portions 117 and the top walls 16c of the side frame portions 16b when the brakes are applied during forward travel of the truck. The other figures of the drawings show the position of the swing hanger links when the brakes are released.

Figure 6:
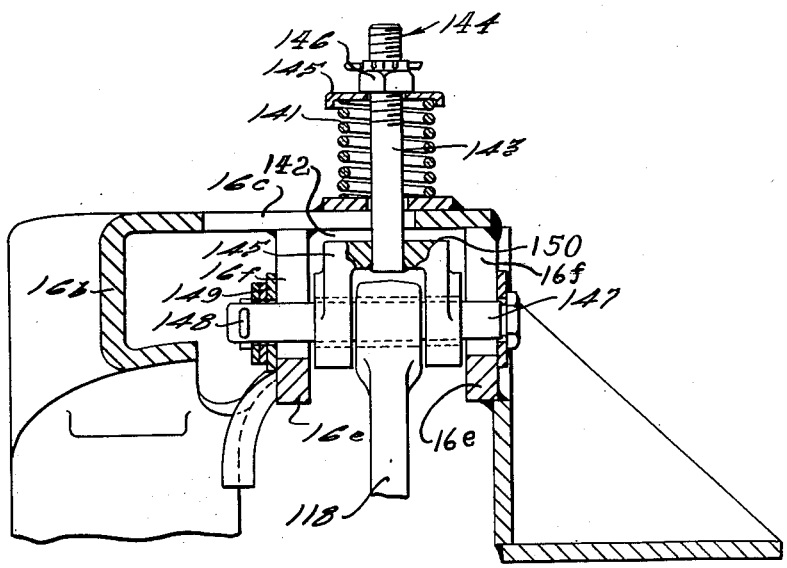
Fig. 6 is an enlarged sectional elevation similar to Fig. 5 embodying a modified form of the invention.

In the modified form of the invention shown in Fig. 6, a coil spring 141 is mounted on the top wall 16c of the side frame end portion 16b above a vertically extending opening 142 piercing the end portion of side frame member 16. Threaded through opening 142 and through the center of coil spring 141 is the vertically extending bolt portion 143 of brake beam hanger support 144. Hanger support bolt portion 143 is suspended from coil spring 141 by means of a washer cap 145 and a nut 146 mounted on the upper threaded end of bolt portion 143. The hanger support 144 includes an integral, U-shaped, yoke portion 145 that is carried by the lower end of bolt portion 143. Yoke portion 145 is positioned beneath the top wall 16c of the side frame member with the sides of yoke portion 145 arranged between the vertically extending flange portions 16e of the side frame member 16. Flange portions 16e have vertically extending slots 16f adapted to slidably receive a pivot pin 147 that pivotally connects the brake beam hanger 118 to the depending leg portions of the U-shaped hanger support yoke portion 145. A cotter pin 148 and washers 149 lock pin 147 in slots 16f. Pivot pin 147 cooperates with the slots 16f in the side frame flanges 16e to provide suitable guideways for the movable, resiliently suspended, hanger support 144. Hanger support yoke portion 145 has a flat upper bearing surface 150 adapted to seat against the lower side of the side frame top wall 16c when the hanger support 144 is moved upwardly by brake reaction during application of the brakes. Seating of the hanger pins 147 in the lower ends of slots 16f limits the downward movement of the hanger support 144 during application of the brakes.

During normal running with the brakes released the hanger supports 144 are resiliently suspended on the springs 141 which absorb the road shock applied to the side frames and prevent its transmission to the brake beam hangers. When the brakes are applied the Fig. 6 arrangement functions in the same manner as the construction shown in Fig. 5 for the hanger supports are moved against rigid frame anchor members which resist the brake reaction resulting from application of the brakes. The Fig. 6 form of the invention, in addition to resiliently supporting the brake beam hangers, includes means that positively guides the movement of the resiliently mounted hanger supports. By providing the pin and slot guideway construction shown in the Fig. 6 modification the coil spring supports for the hanger members are not subjected to tilting or canting during brake application and this increases the life of the springs.

It will be noted that the brake rigging arrangements herein disclosed provide resiliently mounted suspensions for the brake beams during normal running with the brakes released. However, when the brakes are applied the resilient suspension for the brake beams is automatically converted into a non-resilient, rigidly supported, brake rigging arrangement that provides a positive, improved braking action without unnecessarily stressing the resilient suspension. Thus not only has the life of the brake rigging been improved by this construction but in addition an improved braking action results.

Brake rigging supported entirely on resilient suspensions soft enough to cushion road shock will not provide a sufficiently rigid support to take the brake reaction during application of the brakes and thus such an arrangement can not provide a braking action comparable to that obtained with a solidly supported rigging. Brake rigging that is permanently mounted on solid supports is subject to road shock and consequently unnecessary wear and a short life. By the arrangements herein disclosed the desirable features of the resiliently suspended and the rigidly supported brake rigging systems have been combined into a single brake rigging arrangement that is free of the disadvantages of each of the aforementioned systems.

I claim:

1. A brake beam suspension for a railway truck frame member comprising a vertically extending coil spring mounted on the frame member, a vertically extending opening piercing said frame member beneath the opening through said coil spring, a brake beam hanger support suspended from the coil spring and slidably mounted in the frame opening for vertical movement relative thereto in either of two opposite directions, said hanger link including an enlarged portion disposed beneath the opening through the frame member adapted to engage the frame member after predetermined movement of said hanger support in either of said opposite directions to limit the vertical movement of said hanger support and to provide means for anchoring said support against said frame member so as to provide a rigid reaction joint for braking action, and a brake beam hanger link pivotally connected to said hanger support.

2. A brake beam suspension for a railway truck frame member comprising a vertically extending coil spring mounted on the frame member, a vertically extending opening piercing said frame member beneath the opening through said coil spring, a brake beam hanger support suspended from the coil spring and slidably mounted in the frame opening for vertical movement relative thereto in either of two opposite directions, said hanger link including an enlarged portion disposed beneath the opening through the frame member adapted to engage the frame member after predetermined movement of said hanger support in either of said opposite directions to limit the vertical movement of said hanger support and to provide means for anchoring said support against said frame member so as to provide a rigid reaction joint for braking action, a brake beam hanger link pivotally connected to said hanger support, and guide means between said hanger support and said frame member to restrict said hanger support to vertical movement.

3. In a brake beam suspension for a railway car truck, a truck frame provided with a vertically extending opening therethrough, a hanger support movably mounted in said opening including a vertically extending bolt portion having an end disposed above said frame opening and a downwardly opening, U-shaped, yoke portion disposed beneath said frame opening, a horizontally extending projection carried by the end of said bolt portion spaced above said frame opening, a resilient member surrounding said bolt portion and disposed between the projection on said bolt portion and the frame member, vertically slotted, depending, frame flanges adjacent the legs of said U-shaped yoke portion, a hanger member pivotally connected to the yoke portion of said hanger support by bolt means, said bolt means extending through the hanger member, through the slots of said frame flanges and through said yoke portion, said bolt means thereby connecting the suspension to the frame member and providing guide means for the movement of said hanger member, said slotted flanges also providing seats to limit the movement of and to rigidly support said hanger member when the brakes are applied.

4. In a brake beam suspension for a railway car truck, a truck frame provided with a vertically extending opening therethrough, a hanger support movably mounted in said opening including a vertically extending bolt portion having an end disposed above said frame opening and a downwardly opening, U-shaped, yoke portion disposed beneath said frame opening, a horizontally extending projection carried by the end of said bolt portion spaced above said frame opening, a resilient member surrounding said bolt portion and disposed between the projection on said bolt portion and the frame member, vertically slotted frame flanges depending from said frame adjacent the legs of said U-shaped yoke portion, a hanger member pivotally connected to the yoke portion of said hanger support by bolt means, said bolt means extending through the hanger member, through the slots of said frame flanges and through said yoke portion, said bolt means thereby connecting the suspension to the frame member and providing guide means for the movement of said hanger member, and a bearing portion carried by said yoke portion adapted to engage said frame member after a predetermined vertical movement of said hanger support to rigidly support the hanger member on the frame member when the brakes are applied.

5. A brake beam suspension adapted to be mounted on a frame member comprising a hanger support provided with a bolt portion and a depending yoke portion, a coil spring surrounding said bolt portion adapted to extend between the frame member and the bolt portion to resiliently mount the hanger support on the frame member for movement relative thereto in each of two opposite directions, a hanger link pivotally connected to the hanger support yoke portion bolt means mounted on said yoke portion adapted to be slidably connected to the frame member to mount the suspension on the frame member, to limit the relative vertical movement of said hanger support and to provide guide means for the movement of the resiliently supported hanger link.

6. A brake beam suspension adapted to be mounted on a frame member comprising a hanger support provided with a bolt portion and a pivot portion, means carried by said bolt portion adapted to resiliently support said hanger support on the frame member for relative movement with respect thereto, a hanger link pivotally connected to said pivot portion, and a seat portion and a pin portion carried by said hanger support adapted to be engaged with portions of the frame after a predetermined deformation of the resilient supporting means, to limit the relative movement between said hanger support and said frame and to rigidly support said hanger support on the frame.

7. A brake beam suspension adapted to be mounted on a frame member comprising a hanger support provided with a bolt portion and a pivot portion, means carried by said bolt portion adapted to resiliently support said hanger support on the frame member for relative movement in each of two opposite directions, a hanger link pivotally connected to said pivot portion, a seat portion carried by said hanger support adapted to be engaged with the frame after a predetermined deformation of the resilient supporting means, said seat portion being adapted to rigidly support said hanger support on the frame after predetermined movement of the hanger support in either of said two directions, and guide means between said hanger support and the frame to restrict movement of the hanger support to said two opposite directions.

8. In a brake beam suspension for a railway car truck comprising a truck frame member, a hanger support mounted in a vertically extending opening in said frame member for vertical movement relative thereto in each of two opposite directions, said hanger support including a yoke portion disposed beneath said frame member opening, means disposed between said frame member and said hanger support to resiliently mount said hanger support on said frame member, a pin pivotally connecting a hanger link to the yoke portion of said hanger support, vertically extending slots in said frame member receiving portions of said pin to provide guide means for the movement of said hanger support, and means carried by said hanger support engageable with said frame member after a predetermined movement of said hanger support to provide a rigid mounting for said hanger support on said frame member after said predetermined movement of said support in either of said two opposite directions.

9. A shock absorbing suspension for a railway truck brake beam that is mounted on a truck frame member rigidly connected to the truck wheels comprising a resilient unit supported by said frame member, a brake beam hanger support mounted on the resilient unit for vertical movement relative to said frame member in either of two opposite directions, said hanger support including a pair of spaced apart anchor portions arranged so as to be free of the frame member when the brakes are released but adapted to be alternately moved into direct engagement with said frame member when the brakes are applied depending on the direction of wheel rotation, said anchor portions being arranged to limit vertical movement of said hanger support in either of said opposite directions, and a brake beam hanger member pivotally connected to the hanger support.

10. In a railway truck, a truck frame member rigidly supported on the truck wheels, a brake beam suspension carried by said frame member comprising a beam hanger support, resilient means supporting said hanger support on said frame member for vertical movement relative thereto, means connecting said hanger support to said frame member providing guide means for controlling the movement of said hanger support relative to said frame member, said guide means also providing means whereby the hanger support can be rigidly anchored to said frame member after a predetermined compression of said resilient means, and a beam hanger link pivotally connected to said hanger support by said guide means, said hanger link being adapted to have a portion thereof connected to a brake beam.

11. A brake beam suspension adapted to be mounted on a wheeled vehicle frame member comprising a brake beam hanger support, resilient means arranged to mount said hanger support on the frame member for vertical movement relative thereto in each of two opposite directions, anchor means carried by said support directly engageable with said frame member after a predetermined movement of said hanger support in either of said two opposite directions, guide means extending between said frame member and said hanger support to control and limit the movement of the resiliently mounted hanger support, and a beam hanger link carried by said support.

ARCHIE M. MIERS.

REFERENCES CITED

The following references are of record in the file of this patent:

UNITED STATES PATENTS

| Number | Name | Date |
| --- | --- | --- |
| 455,927 | Osborne | July 14, 1891 |
| 1,199,937 | Smalley | Oct. 3, 1916 |
| 2,215,351 | Farmer | Sept. 17, 1940 |